(12) United States Patent
An et al.

(10) Patent No.: US 9,859,789 B2
(45) Date of Patent: Jan. 2, 2018

(54) RUBBER-TYRED GANTRY CRANE (RTG) DUAL POWER ENERGY SAVING SYSTEM

(71) Applicant: Shenzhen Anshun Energy-saving Technology Development Co., Ltd, Shenzhen (CN)

(72) Inventors: Tonghui An, Shenzhen (CN); Kai Jia, Shenzhen (CN)

(*) Notice: Subject to any disclaimer, the term of this patent is extended or adjusted under 35 U.S.C. 154(b) by 208 days.

(21) Appl. No.: 14/846,785

(22) Filed: Sep. 6, 2015

(65) Prior Publication Data

US 2016/0159619 A1 Jun. 9, 2016

(30) Foreign Application Priority Data

Dec. 5, 2014 (CN) .......................... 2014 1 0736525
Dec. 5, 2014 (CN) ...................... 2014 2 0759248 U

(51) Int. Cl.
*H02M 3/04* (2006.01)
*B60L 11/02* (2006.01)
*H02M 7/04* (2006.01)
*H02M 7/44* (2006.01)
*B66C 13/28* (2006.01)

(52) U.S. Cl.
CPC .............. *H02M 3/04* (2013.01); *B60L 11/02* (2013.01); *B66C 13/28* (2013.01); *H02M 7/04* (2013.01); *H02M 7/44* (2013.01)

(58) Field of Classification Search
CPC .......... H02M 3/04; B60L 1/00; B60L 3/0046; B60R 16/03; B60R 16/00; B60N 3/00
USPC ....................................... 307/9.1, 10.1, 10.7
See application file for complete search history.

(56) References Cited

U.S. PATENT DOCUMENTS

2007/0176490 A1* 8/2007 He .......................... B60L 11/08
307/10.1

* cited by examiner

*Primary Examiner* — John Poos
(74) *Attorney, Agent, or Firm* — Wayne & Ken, LLC; Tony Hom

(57) ABSTRACT

The present invention discloses a double-power energy saving system of rubber tire gantry crane (RTG), which is composed of a controller, a battery pack, a generator set and so on. The system changed the power supply mode of traditional RTG which is powered by a single generator set or a superposition of a generator set and a battery pack. Both the battery pack and the generator set of the system can support the RTG operations independently, forming the double-power energy saving system to improve the equipment reliability. The battery pack is used as the primary power source for RTG and the output power can be highly matched with the demanded power, which reduces the reactive loss and increases the energy efficiency. The generator set is shut down and the power is supplied by the battery pack when the electricity of the battery pack is high; the generator set is started to supply power directly for RTG when the electricity of the battery pack is low, and the surplus energy can charge the battery pack. Once the battery pack is put into operation, it will run in the best economical fuel consumption area to achieve the highest fuel efficiency. The feedback energy of RTG can be fully recovered because the charging power of the battery pack is larger than the maximum feedback energy power of RTG. It is not required to replace the original generator set of RTG when the system is applied to RTG transformations.

4 Claims, 2 Drawing Sheets

RUBBER-TYRED GANTRY CRANE (RTG) DUAL POWER ENERGY SAVING SYSTEM

CROSS-REFERENCE TO RELATED APPLICATIONS

This application claims priority benefits to Chinese Patent Application No. 201410736525.1 filed on Dec. 5, 2014 and Chinese Patent Application No. 201420759248.1 filed on Dec. 5, 2014. The contents of all of the aforementioned applications, including any intervening amendments thereto, are incorporated herein by reference.

THE TECHNICAL FIELD

The present invention relates to a power system of terminal equipment, belonging to the field of new energy application, and is mainly applied to rubber tyre gantry crane (hereinafter referred to as RTG).

THE BACKGROUND TECHNOLOGY

With the development of the world economy, industrial production and transportation etc. are depending higher and higher on oil, and the following environmental issues such as the greenhouse effect, ecological deterioration become increasingly severe. How to maintain the harmonious development between economy and environment has become the focus of the global concerns. The conventional RTG in terminals uses one generator set as the power and the fuel efficiency is less than 30%. Main reasons are as follows:
  a) Large installed capacity: to meet the short-time highest load demand of RTG, the power of the generator set must be designed according to the maximum demand of RTG, about eight times larger than the average power while the RTG is under actual operations,
  b) Low fuel efficiency: when the generator set is running in the best economical fuel consumption area, the best energy efficiency is received. To ensure the normal power for the controlling system and the operating mechanism, the output power of the generator set must be higher than the power demand of RTG while the RTG is working. The generator set should run at the rated speed continuously. Due to the different power demands under different working conditions of RTG, real-time adjustment of output power for the generator set is required to match the power demand of RTG. Therefore, most of the time the generator set is running off the best economical fuel consumption area, and the energy efficiency is low. As shown in section A of the fuel consumption characteristics loop image in FIG. 2, when the generator set is running under the rotational speed of 1200-1300 RPM and the output power is about 240 kW, the fuel consumption rate is lowest to 186 g/kWh which is called "the best economical fuel consumption area". When the system power demand reduces to below 40 kW, the fuel consumption rate reaches up to 426 g/kWh (section B in FIG. 2), which is 2.3 times of the best economical fuel consumption rate. When the RTG is accelerating speed with heavy load while lifting, black smoke and serious pollution will be caused by poor fuel combustion of engine.
  c) No function for recovery of braking energy: when the hoisting mechanism of RTG is declining, the trolley travelling mechanism and the cranes travelling mechanism are decelerating and braking, since there are no energy storing devices, all the feedback energy has to be consumed through power resistors in real time.

THE CONTENT OF THE PRESENT INVENTION

For the above-mentioned shortcomings of RTG, the present invention discloses a double power energy saving system of rubber tyre gantry crane (RTG), which aims at realizing the high matching between the output power and the demanded power, thereby increasing the energy efficiency and reducing the overall energy consumption of RTG, and achieving energy saving and emission reduction.

The present invention changes the power supply mode of traditional RTG which is powered by one generator set or a power superposition of a generator set and a battery pack. As the double power source, both the battery pack and the generator set can independently meet the requirements of normal operating power for RTG.

When the electricity of the battery pack is under the set range, RTG uses the battery pack as power source to realize high matching between the output power of the power source and the RTG power demand in the whole process. When the battery pack is short of electricity, the generator set is started to supply power. Once the generator set is put into operation, it is controlled to run in the best economical fuel consumption area, so as to run with the highest efficiency. When the generator set supplies power for RTG directly, the surplus energy will charge the battery pack and the generator set will shut down when the electricity of the battery pack reaches to the set high-value.

The charging power of the battery pack is larger than the maximum feedback energy power of the RTG, and the feedback energy can be fully recovered.

The detailed descriptions of the system are as follows:
  a) Both the generator set and the battery pack can support the RTG operations independently, forming the "double power" source for RTG, which can be switched to the generator set mode to improve the RTG reliability when the battery pack is faulty.
  b) The generator set works intermittently. The engine will be shut down when the electricity of the battery pack reaches to the set high-value of the system, and the RTG is powered completely by the battery pack. When the electricity of the battery pack reduces to the set low-value, the generator set will be started to supply power for the RTG directly and meanwhile the surplus energy can charge the battery pack. Once the generator is put into operation, it will always run in the best economical fuel consumption area, so as to run with the highest efficiency.
  c) When the hoisting mechanism of RTG is declining, the trolley travelling mechanism and the crane travelling mechanism and other mechanisms are decelerating and braking, the feedback energy is produced and can be recovered to the battery pack, which realizes cyclic utilization.

The purpose of the present invention can be realized by the following technical scheme:

Add a system of battery power source, which is mainly composed of a battery pack, an inverter, a 24V DC power supply and a system controller and so on without changing the performance parameters and structures of the original equipment of RTG.

The input terminal of the inverter is connected in parallel with the DC bus, and the output terminal supplies power for lights, air conditioners and other electric equipment of the RTG through the auxiliary transformer. The input terminal of the 24V DC is connected in parallel with the DC bus, and the output terminal supplies DC power for the RTG controlling system.

When the old RTG equipment is carried on energy saving transformation according to the present invention, it is not required to replace the original dynamical system of RTG or to change any parameters and structures of the original equipment. The energy conservation transformation can be finished only by adding a group of power battery supply and controlling system. For the new transformed RTG equipment, the energy-saving effect is better through accurate calculation to configure the parameters of the generator set and the battery pack.

THE DESCRIPTION OF THE ACCOMPANYING DRAWINGS

THE DETAILED IMPLEMENTATION METHODS

The present invention will be described in detail as below with reference to the accompanying drawings.

Figure 1:
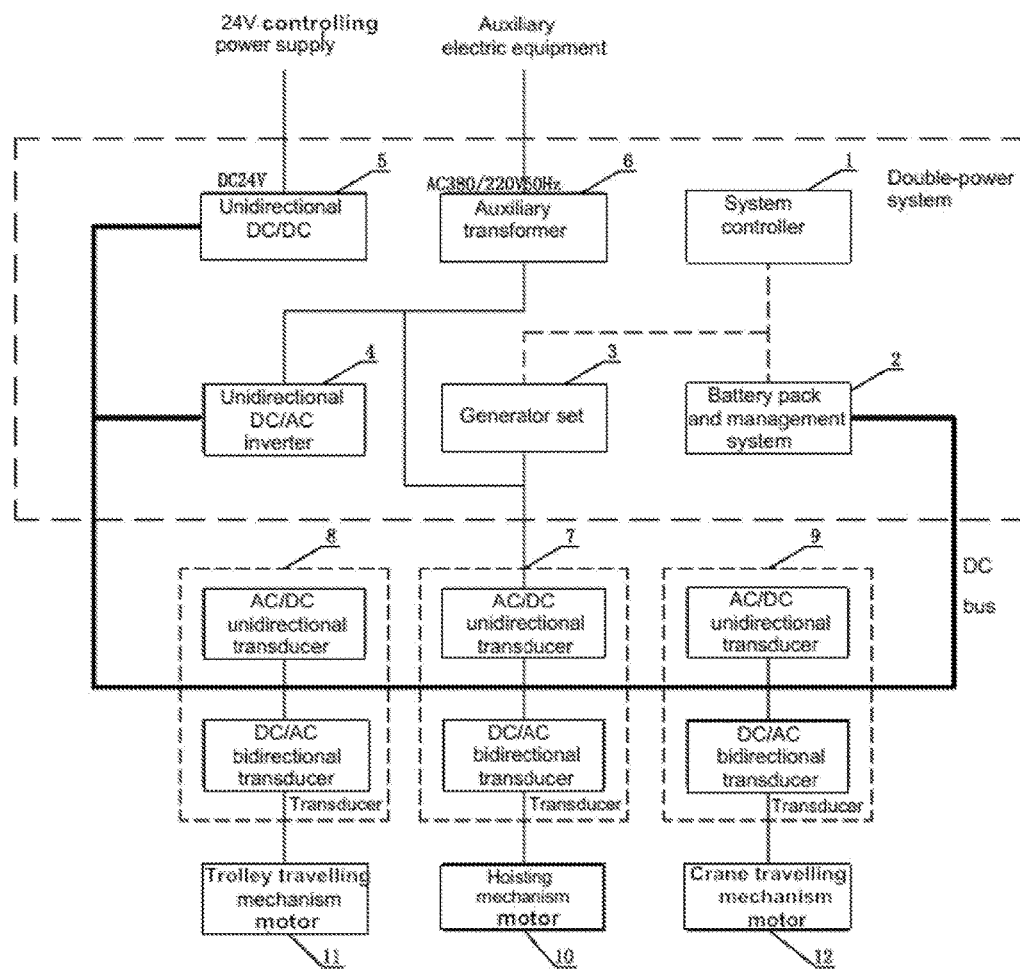
FIG. 1 is the double-power system schematic of the present invention.

As shown in FIG. 1, the present invention is a double power energy saving system of RTG, using a battery pack as the primary power supply when it is working. It is mainly composed of a system controller 1, a battery pack and a management system 2, a generator set 3, a unidirectional DC/AC inverter 4, a unidirectional DC/DC direct-current power supply 5 and an auxiliary transformer 6 etc. The electric equipment of the RTG associated with the system are mainly composed of a hoisting mechanism transducer 7, a trolley travelling mechanism transducer 8, a crane travelling mechanism transducer 9, an auxiliary electric equipment and a controlling power supply and so on.

The connection mode and main functions of each component are as follows:

The battery pack 2 is connected with the DC bus of the RTG, which provides power, the auxiliary power supply, the DC controlling supply and the recycled energy for the operating mechanism. The input terminal of the inverter 4 is connected in parallel with the DC bus, and its output terminal is connected with the auxiliary transformer 6 which outputs AC380V/220V/50 Hz three-phase four-wire power supply to be used by lights, air conditioners and other auxiliary electric equipment of RTG. The input terminal of 24V DC power supply is connected in parallel with the DC bus and its output terminal supplies controlling power for RTG. The generator set 3 is divided into a two-way output, one of which is connected with the AC input terminal of the RTG hoisting mechanism transducer 7, and is connected in parallel with the DC bus after rectification, supplying power for the RTG operating mechanism, or charging the battery pack; the other of which is connected with the input terminal of the auxiliary transformer 6, supplying power directly for the auxiliary mechanism when the generator set is put into normal operation.

The energy management controlling and working principle of the system are described in detail as follows:

To set the voltage working range of the battery pack 2 according to the electricity-voltage characteristic of battery (or through DC/DC) to match that of the transducer, so as to ensure the stability of the RTG controlling system.

The system controller 1 monitors the voltage, electricity and other conditions of the battery pack 2, and controls the stations of start, idle speed, full speed or extinction of the generator set 3.

When the electricity of the battery pack 2 is within the set working range, the power of the whole machine will be supplied by the battery pack 2 through the DC bus. When the electricity of the battery pack 2 reduces to the set low-value, the generator set 3 will be started. After the generator set 3 is put into normal operation, it supplies power for all the electric equipment of RTG and the surplus energy charges the battery pack 2. With the increase of the electricity of the battery pack 2, the voltage is rising gradually, and when the voltage of the battery pack 2 rises to the set high-value, the generator set 3 will be controlled by the system controller 1 to run at the idle speed for a period of time, then it will extinct and shut down.

Figure 2:
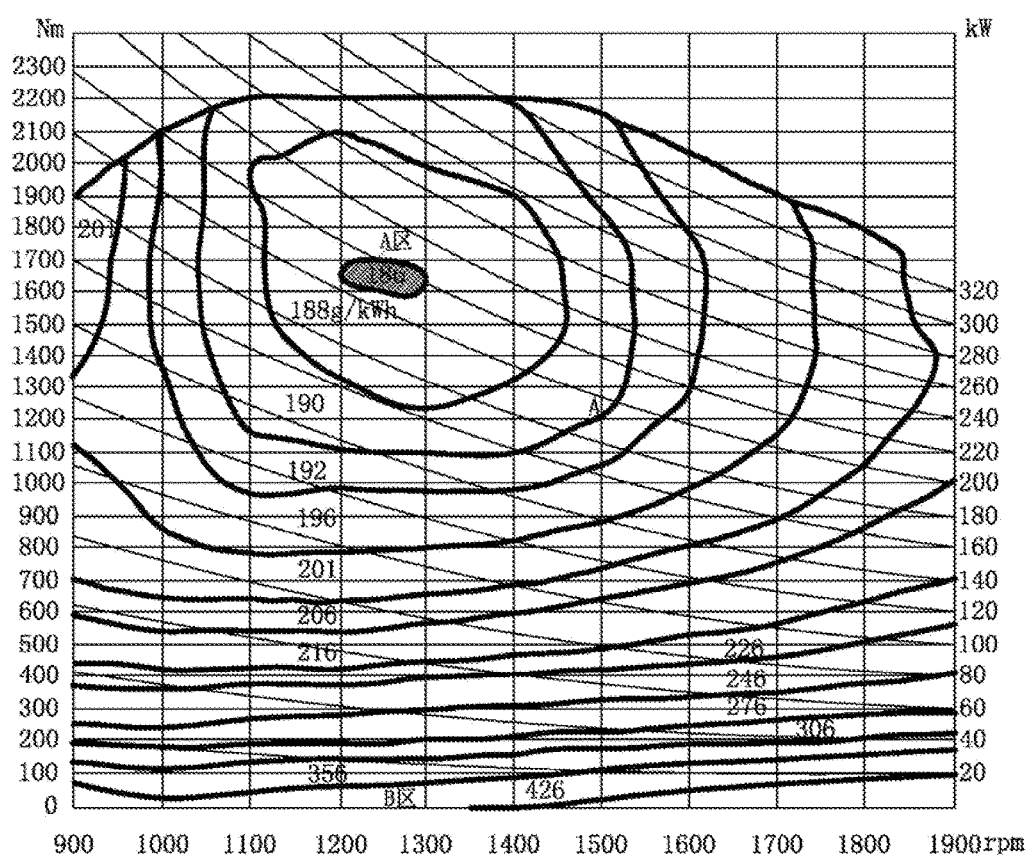
FIG. 2 is the diesel fuel consumption characteristics loop image.

The output power controlling of the generator set 3: as shown in the diesel fuel consumption characteristics loop image in FIG. 2, the best fuel efficiency is achieved when the diesel runs at a rotational speed of 1500 RPM and the output power is within 200 kW~300 kW, and the system controller 1 controls the output power of the generator set 3 to be within 200 kW~300 kW. When the battery pack 2 starts at low electricity, since the voltage of the battery pack 2 is lower and the charging current is larger, the charging power will be larger than the rated output power of the generator set 3, by this time the system controller 1 limits the maximum charging current of the battery pack 2 through controlling, so as to ensure the sum of the charging power and the RTG normal working power demand is not larger than the rated power of the generator set 3, that is, to control the output power of the generator set 3 to be less than 300 kW. With the constant increase of the voltage of the battery pack 2, the charging current is decreasing gradually. When the sum of the charging power and RTG system power demand deviates from the economical fuel consumption of the generator set 3, that is, less than 200 kW, the generator set 3 will be shut down. Once the generator set 3 is put into operation, it will always run in the economical fuel consumption area and the fuel efficiency is highest.

Energy recycling and controlling: each operating cycle of the RTG will produce a certain percentage of feedback energy, when the feedback energy is produced, the bus voltage is rising, and the feedback energy will first supply power for the inverter 4 and the 24V DC power supply 5 and the surplus energy will be recovered to the battery pack 2; the recovered energy will be used in the next operating cycle of RTG. Due to the energy loss exists in each charge-discharge, in theory the recovered energy can be recycled until approaching to "0" but never reaching to "0", which realizes energy recycling.

In conclusion, aiming at the operating characteristic of the rubber tyre gantry crane (RTG), the present invention proposes a double power energy saving system of RTG, which uses a battery pack as the main power source, and the battery pack can support all electric operation of RTG for a period of time, realizing the complete matching between the output power of the power source and the equipment power demand in the whole process to increase energy efficiency, achieving recovery and recycling for the RTG braking energy. Once the generator set is put into operation, it is controlled to output power under the best energy efficiency and the energy efficiency is highest. The engine is not overloaded and no black smoke appears. The running time of the generator set is shortened and the maintenance period is extended.

The characteristics of the double power energy saving system of rubber tyre gantry crane according to the present invention are as follows:
1. Both the power of the generator set 3 and the battery pack 2 can meet the maximum power demand of RTG and support the RTG operations independently, which improves the equipment reliability. The RTG uses the battery pack 2 as the primary power source and the output power of the battery pack 2 can be completely matched with the RTG power demand in the whole process, which increases the energy efficiency.
2. The generator set 3 works intermittently. Once the generator set is put into operation, it is controlled to run under the economical fuel consumption area, and the fuel efficiency is high, which realizes the engine to be not overloaded and no black smoke appears. The running time of the generator set is shortened and the maintenance period is extended.
3. The full recovery and recycling of the RTG feedback energy is realized.
4. When the old RTG equipment is carried on energy conservation transformation according to the present invention, it is not required to replace the original dynamical system of RTG or to change any parameters and structures of the original equipment, which reduces the transformation cost. The energy-saving effect of the new transformed RTG equipment is much higher through accurate calculation to configure the parameters of the generator set and the battery pack.

The above mentioned implementation methods of the present invention should not become a restriction to the protection scope of the invention. Any modifications, equivalent replacements or improvements etc. in the spirit and principle of the present invention should be included in the protection scope of the claims of the present invention.

We claim:

1. A double power energy saving system of rubber-tyred gantry crane (RTG) comprising: a system controller, a battery pack, a battery management system, a generator set, a unidirectional DC/AC inverter, a unidirectional DC/DC direct-current power supply and an auxiliary transformer; an electric equipment of the RTG associated with the system includes a hoisting mechanism transducer, a trolley travelling mechanism transducer, a crane travelling transducer, an auxiliary electric equipment, and a controlling power supply;
wherein
the battery pack is connected in parallel with a DC bus of a RTG operating mechanism variable frequency drive, the battery pack provides motive power for the operating mechanism, and power for an auxiliary power supply and a 24V DC power supply when an inverted energy is fed back from the operating mechanism, the inverted energy is supplied to the unidirectional DC/AC inverter through the DC bus and the battery pack is charged by a surplus energy of generator set and the inverted energy;
an input terminal of the unidirectional DC/AC inverter is connected in parallel with the DC bus, the unidirectional DC/AC inverter converts a direct current into an alternating current, and the alternating current is then output; an output terminal of the unidirectional DC/AC inverter is connected with the auxiliary transformer, and the auxiliary transformer outputs an alternating current of three-phase four-wire with 380V/220V/50 Hz to supply a plurality of lights, air-conditioners and other auxiliary electric equipment of the RTG;
an input terminal of the 24V DC power supply is connected with the DC bus, and an output terminal of the 24V DC power supply supplies power for the controlling power supply of the RTG;
the generator set has a two-way output, a first output is connected with an AC input terminal of the RTG hoisting mechanism transducer, and the first output is connected in parallel with the DC bus after a rectification to supply power for the RTG operating mechanism, the unidirectional DC/AC inverter, and the 24V DC power supply or charge the battery pack; a second output is connected with an input terminal of the auxiliary transformer supply power directly for an auxiliary mechanism when the generator set is in a normal operation;
the generator set or the battery pack supports a plurality of RTG operations independently; the RTG uses the battery pack as a primary power source and outputs power highly matched with a demanded power; the generator set works intermittently and is controlled to work in an economical fuel consumption area; and the generator set works in the economical fuel consumption area or in idling or is shut down.

2. The double power energy saving system of rubber-tyred gantry crane (RTG) of claim 1, wherein a voltage working range of the battery pack is completely matched with that of the RTG variable frequency drive, and the battery pack is directly connected in parallel with the DC bus of the variable frequency drive of the RTG operating mechanism without adding the DC/DC direct-current power supply.

3. The double power energy saving system of rubber-tyred gantry crane (RTG) of claim 1; wherein no replacement of an original generator set of the RTG is required when the system is applied to an RTG transformation.

4. The double power energy saving system of rubber-tyred gantry crane (RTG) of claim 1, wherein the feedback energy is fully recovered to the battery pack, since the demanded power is larger than the maximum feedback energy power of the RTG.

* * * * *